United States Patent [19]

Dounn et al.

[11] Patent Number: 5,533,031
[45] Date of Patent: Jul. 2, 1996

[54] ADJUSTABLE READ CHANNEL EQUALIZATION FOR ERROR PROCESSING IN A RECORDABLE MEDIA DRIVE

[75] Inventors: Paul J. Dounn; Terry L. Kise, both of Tucson, Ariz.; Richard C. Schneider, Boulder, Colo.; Morovat Tayefeh, Tucson, Ariz.

[73] Assignee: International Business Machines Corporation, Armonk, N.Y.

[21] Appl. No.: 265,538

[22] Filed: Jun. 24, 1994

[51] Int. Cl.[6] ................................................. G11C 29/00
[52] U.S. Cl. .............................. 371/21.1; 360/65; 360/67; 375/345
[58] Field of Search ........................... 371/21.1; 360/39, 360/65, 67; 369/59, 60; 375/345

[56] References Cited

U.S. PATENT DOCUMENTS

| | | | |
|---|---|---|---|
| 4,326,226 | 4/1982 | Touchton et al. | 360/77 |
| 4,340,950 | 7/1982 | Kosaka | 369/44 |
| 4,616,356 | 10/1986 | Wilkinson et al. | 369/116 |
| 4,736,257 | 4/1988 | Watanabe et al. | 358/340 |
| 4,829,499 | 5/1989 | Abe | 369/59 |
| 4,953,041 | 8/1990 | Huber | 360/46 |
| 5,107,379 | 4/1992 | Huber | 360/46 |
| 5,132,988 | 7/1992 | Fisher et al. | 375/14 |
| 5,166,914 | 11/1992 | Shimada et al. | 369/32 |
| 5,293,369 | 3/1994 | Melas et al. | 369/59 |
| 5,341,249 | 8/1994 | Abbott et al. | 360/46 |
| 5,345,342 | 9/1994 | Abbott et al. | 360/48 |
| 5,355,356 | 10/1994 | Johann et al. | 369/59 |
| 5,361,174 | 11/1994 | Seki et al. | 360/46 |
| 5,375,145 | 12/1994 | Abbott et al. | 375/98 |
| 5,414,571 | 5/1995 | Matsushige et al. | 360/65 |
| 5,450,253 | 9/1995 | Seki et al. | 360/65 |
| 5,467,370 | 11/1995 | Yamasaki et al. | 375/232 |

FOREIGN PATENT DOCUMENTS 57-175519  10/1982  Japan ........................ G11B 7/00

OTHER PUBLICATIONS

Astrom et al., "Computer Controlled Systems", 1984, p. 351.
"Adaptive Ditigal Readback Equalization for Recording Devices", IBM Technical Disclosure Bulletin, vol. 35, No. 7, Dec. 1992, pp. 43–44.
C. W. Reno and R. J. Tarzaiski, "Optical Disk Recording at 50 Megabits/Second", SPIE vol. 177, Optical Information Storage (1979), pp. 135–147.

Primary Examiner—Emanuel T. Voeltz
Assistant Examiner—Patrick J. Assouad
Attorney, Agent, or Firm—Baker, Maxham, Jester & Meador

[57] ABSTRACT

In a recordable media drive, error processing is implemented in an adjustable read channel equalizer in which gain and bandwidth values can be selectively adjusted. In a write/verify procedure, the gain value is reduced, while the bandwidth is increased, thereby stressing the read channel during verification of written sectors in order to force the failure of marginal sectors. In an error recovery procedure, when a sector error is encountered, the gain value of the adjustable equalizer is initially increased and a sequence of read retries of the failed sector is initiated.

12 Claims, 3 Drawing Sheets

ADJUSTABLE READ CHANNEL EQUALIZATION FOR ERROR PROCESSING IN A RECORDABLE MEDIA DRIVE

FIELD OF THE INVENTION

The present invention relates to a recordable media drive for recording information on a recordable storage medium and reading and reproducing the information from the medium. In particular, the present invention relates to adjustment of the parameter values in a read channel equalizer of the drive for error processing of data read from a recordable storage medium.

In recordable media drives in which a recordable storage medium is moved with respect to write and read elements for storage of data on the medium and reproduction of the data from the medium, medium noise and interference corrupt the signal read back from the medium during reproduction. For example, hard sector noise from an embossed header of a sector may intrude into the data area of the sector and greatly reduce the amplitude of the high-frequency components of the readback signal. Other noise phenomena such as defects of the medium and imperfect replication in the data written to the medium contribute to reduction in readback signal resolution. The total contribution of noise can result in diminished data reliability, increased error occurrence, and, in extreme cases, loss of sectors on the medium.

Noise effects are dealt with in certain recordable media drives by adjustment of read channel parameters during certain read operations. For example, in optical disk drives, the read channel may be tuned or stressed during the write/verify operation in order that marginal sectors might be reassigned to a spare sector region during this operation, rather than during subsequent read operations. Present stressing techniques utilize programmable detection window stress or "window skew" to implement write/verify stress. However, window skew resolution is generally quite coarse and may not be sufficient to accurately set the desired amount of verify stress. Additionally, indirect methods of measuring the absolute amount of window skew must be used which are costly and time-consuming.

Further, even though a sector might be guaranteed as recoverable by a write/verify operation, the medium factors which contribute noise during reproduction may increase in magnitude over time and result in increasing error rates and eventual reassignment of a sector.

Accordingly, there is a manifest need in recordable media drive technology for effective, low cost techniques that enhance the reliability of the write/verify operation and that add to the efficacy of error recovery procedures for recorded data.

SUMMARY OF THE INVENTION

The invention is based on the inventors' critical observation that selective adjustment of amplification and bandwidth in a read channel equalizer can very effectively stress the read channel during the write/verify mode of operation and, with the implementation of a simple error recovery technique, significantly enhance the error recovery processing of a recordable media drive.

Accordingly, the invention utilizes selective adjustment of the amplification and bandwidth parameters of a read channel equalizer in lieu of window skew in order to achieve the desired read channel stress during a write/verify operation and utilizes selective adjustment of equalizer amplification to implement an effective error recovery procedure in the face of poor data resolution.

The achievement of these objectives and other important advantages by the invention will be appreciated when the following detailed description is read with reference to the below-described drawings.

DETAILED DESCRIPTION OF THE PREFERRED EMBODIMENT

The following description is presented in the context of an optical disk drive apparatus. However, this is not intended to limit the application of the invention solely to optical media drives. Indeed, the inventors contemplate application of the principles to be described in detail to other recordable media drives including, but not limited to, hard disk drives, floppy disk drives, and tape drives.

Further, the invention includes a media drive recording channel equalizer which is described as "adjustable". This term is meant to be distinct from the term "adaptive". In this regard, "adjustment" according to the invention is carried out by media drive control to implement drive functions. Consequently, the channel equalizer is not "adaptive" in that it does not automatically change its operational characteristics to adapt to changes in readback signal attributes.

Figure 1:
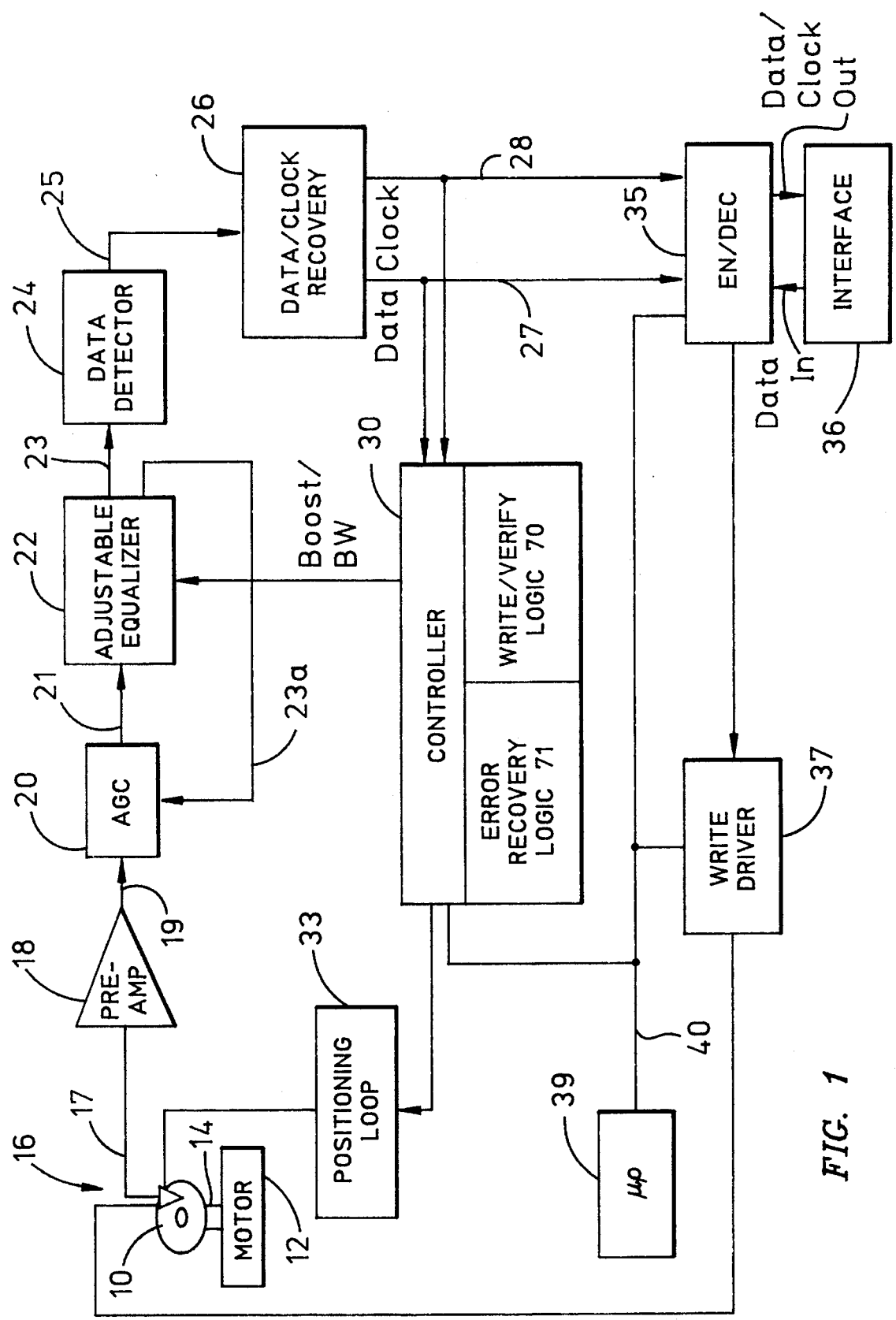
FIG. 1 is a block diagram of a recordable media drive recording channel utilizing an adjustable equalizer according to the invention.

FIG. 1 illustrates the record channel architecture of an optical media drive in which an optical disk 10 is mounted to a motor 12 on a hub 14. The motor 12 rotates, causing the disk 10 to rotate for writing and reading of data by means of an optical read/write head assembly 16. Data stored on the optical disk 10 is reproduced by a read element of the optical read/write head assembly 16 in the form of a readback signal 17. The readback signal 17 is fed to a preamplifier 18, boosted by the preamplifier 18, and output as an amplified readback signal 19. The amplitudes of the amplified readback signal 19 is stabilized by an automatic gain control (AGC) circuit 20, which produces an amplified, gain-controlled readback signal 21. The amplified, gain-controlled readback signal 21 is input to an adjustable equalizer 22 and an equalized, amplified, gain-controlled readback signal 23 is output by the equalizer 22. The equalized, amplified, gain-controlled readback signal 23 is input to a data detector 24 which operates conventionally to detect signal levels in the signal 23; producing an output signal 25 that is fed to a data and clock recovery circuit 26 that operates conventionally to recover a data signal 27 and a clock Signal 28 from the output signal 25. The data and clock signals 27 and 28 are fed to a media drive controller 30 that implements well-known control functions in response to the data and clock signals, 27 and 28. In addition to the conventional control, functions necessary, for example, to select sectors the disk 10 for writing and reading, and to position the read/write assembly 16 by way of the positioning loop 33, the controller 30 provides equalizer configuration signals on an output 31 that is connected to a control input of the adaptive equalizer 22. These equalizer configuration signals are the means by which the controller 30 adjusts characteristics of the adjustable equalizer 22.

Continuing with a description of the readback portion of the record channel, the data and clock signals 27 and 28 are provided to an encoder/decoder circuit 35 which decodes the data signals, providing them as an output of the recordable media drive by way of an interface 36. Data for writing to the disk 10 is provided through the interface 36 to a write driver 37. The write driver 37 is coupled to a write element on the optical read/write head assembly 16.

A microprocessor 39 is coupled by a conventional interface 40 which may comprise, for example, a bus or a custom gate array to the controller 30, write driver 37, and encoder/decoder 35. The microprocessor 39 provides conventional high-level control functions and data buffering for the recordable media drive.

Figure 2:
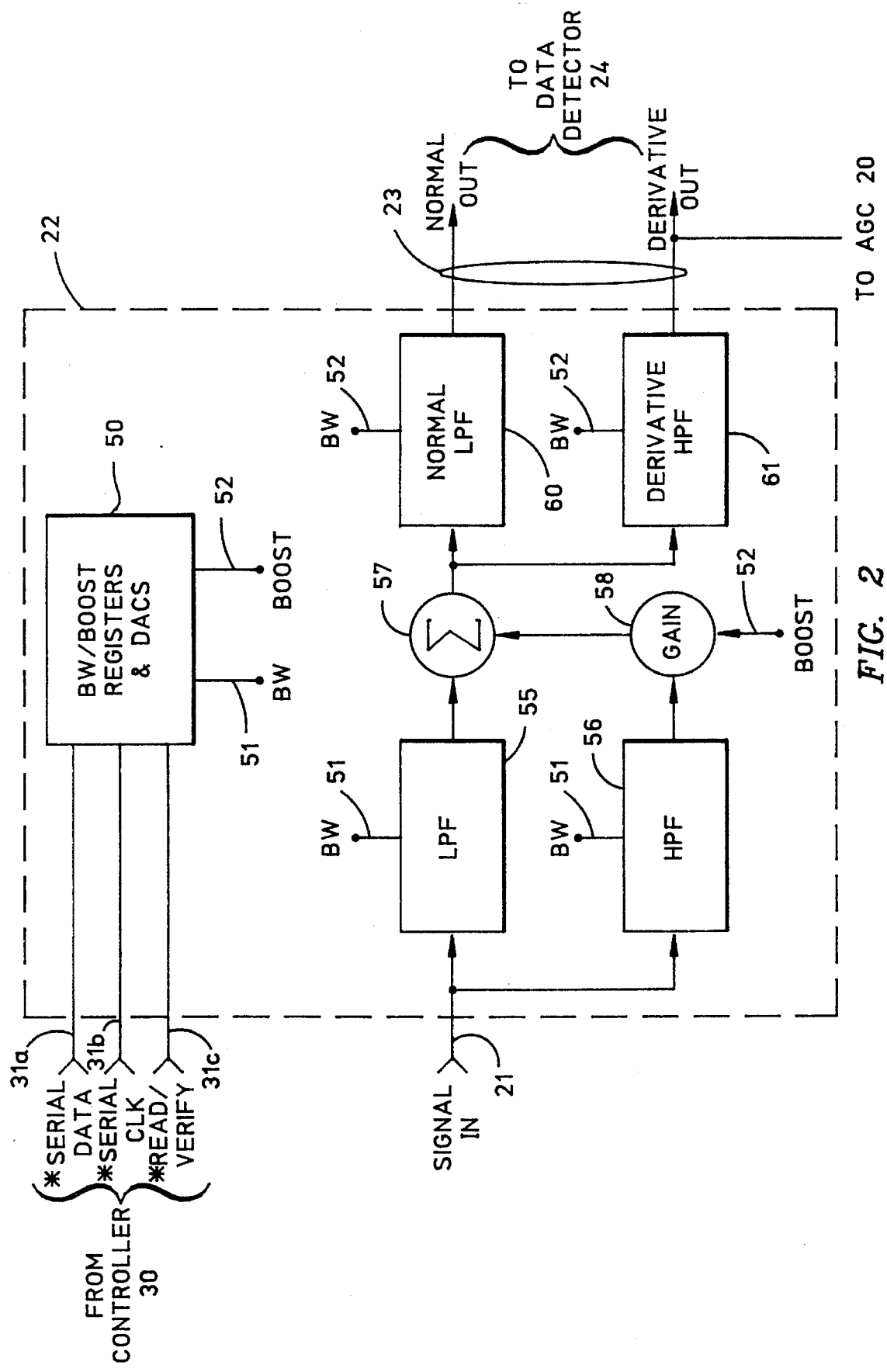
FIG. 2 is a detailed block diagram of the adjustable equalizer.

FIG. 2 is a block diagram showing the adjustable equalizer 22 in greater detail. The adjustable equalizer 22 includes a plurality of registers and digital-to-analog converters (DACs) in a register and DAC circuit 50. The registers receive digital control words embodying the equalizer configuration signals produced by the controller 30 and the DACs convert them to analog form. The analog signals produced by the register and DAC circuit 50 include a bandwidth adjustment signal 51 and a gain (or "boost") adjustment signal 52. The adjustable equalizer 22 receives the amplified, gain-controlled signal 21 at the input of a low pass filter (LPF) 55 and at the parallel input of a high pass filter (HPF) 56. The coefficients of the filters 55 and 56 are set by the bandwidth (BW) adjustment signal 51. Filtered signals produced by the filters 55 and 56 are combined in a summation circuit 57 and a gain circuit 58. The gain circuit 58 receives the output of the high pass filter 56 and amplifies the output at a gain level set by the state of the boost adjustment signal 52. The amplified output of the high pass filter 56 is combined in the summation circuit 57 with the output of the low pass filter 55. This boosts the amplitude of the high frequency content of the readback signal to compensate for high frequency roll-off or peak shift. The signal produced by the summation of the amplified high pass filter output and the low pass filter output is fed in parallel to the input of a low pass filter 60 and the input of a high pass filter 61. The coefficients of the filters 60 and 61 are set by the bandwidth adjustment signal 51. The low pass filter 60 produces a normal output signal while the high pass filter 61 produces a derivative output signal. Both the normal and derivative output signals from the adjustable equalizer 22 are fed to the data detector 24; additionally, the derivative output signal is fed back to set the gain level at the AGC circuit 20.

The adjustable equalizer of FIG. 2 is known and is commercially available from a number of vendors: The adjustable equalizer 22 may comprise, for example, the low-power, programmable filter device, product number 32F81XX, available from Silicon Systems.

The configuration of the adjustable equalizer 22 in terms of filter bandwidth as represented by the bandwidth signal 51 and gain as represented by the boost signal 52 is set by the equalizer configuration signals embodied in the digital control words on a serial data signal line 31 as synchronized by a clock signal on a serial clock line 31b. A control signal (Read/Verify) on signal line 31c selects respective boost and bandwidth registers in the register and DAC circuit 50 for normal Read mode and stressed write/verify mode.

The operation of the invention will now be explained with reference to the well-known write/verify operation employed in optical recording wherein data are written to an optical disk on a first pass and then read on a following pass in order to verify the write operation. In this regard, in a recordable optical media drive, data are written in sectors. Each sector includes a header followed by a data track. Sector locations are known and when data is written to a sector, the controller 30 employs the positioning loop 33 to locate the read element for reading the sector. The invention is utilized in the write/verify operation to mimic a high-noise sector environment and attempts to make the readback signal less reliable than it may be in order to detect and reassign marginal sectors. The write/verify logic is contained in the controller 30 and is indicated by the reference numeral 70. The write/verify logic is conventional in most respects. It preferably consists of microcode in a programmable device, but may be implemented in hardware. In the practice of the invention, the write/verify logic 70 is invested with a novel function that stresses the read channel by appropriate setting of the bandwidth and gain adjustment signals in the adjustable equalizer 22. In this regard, the equalizer's gain is reduced, while the bandwidths of the filters in the adjustable equalizer 22 are increased. Manifestly, the "stress" of the read channel lies in the reduction of the signal to noise ratio achievable by increasing the bandwidth combined with peak-shift stress resulting from boost control.

With read channel stressing introduced by selective adjustment of the bandwidth and boost values of the adaptive equalizer 22, marginal sectors which might otherwise be verified will fail and be listed in a media defect list maintained by the microprocessor 39.

Figure 3:
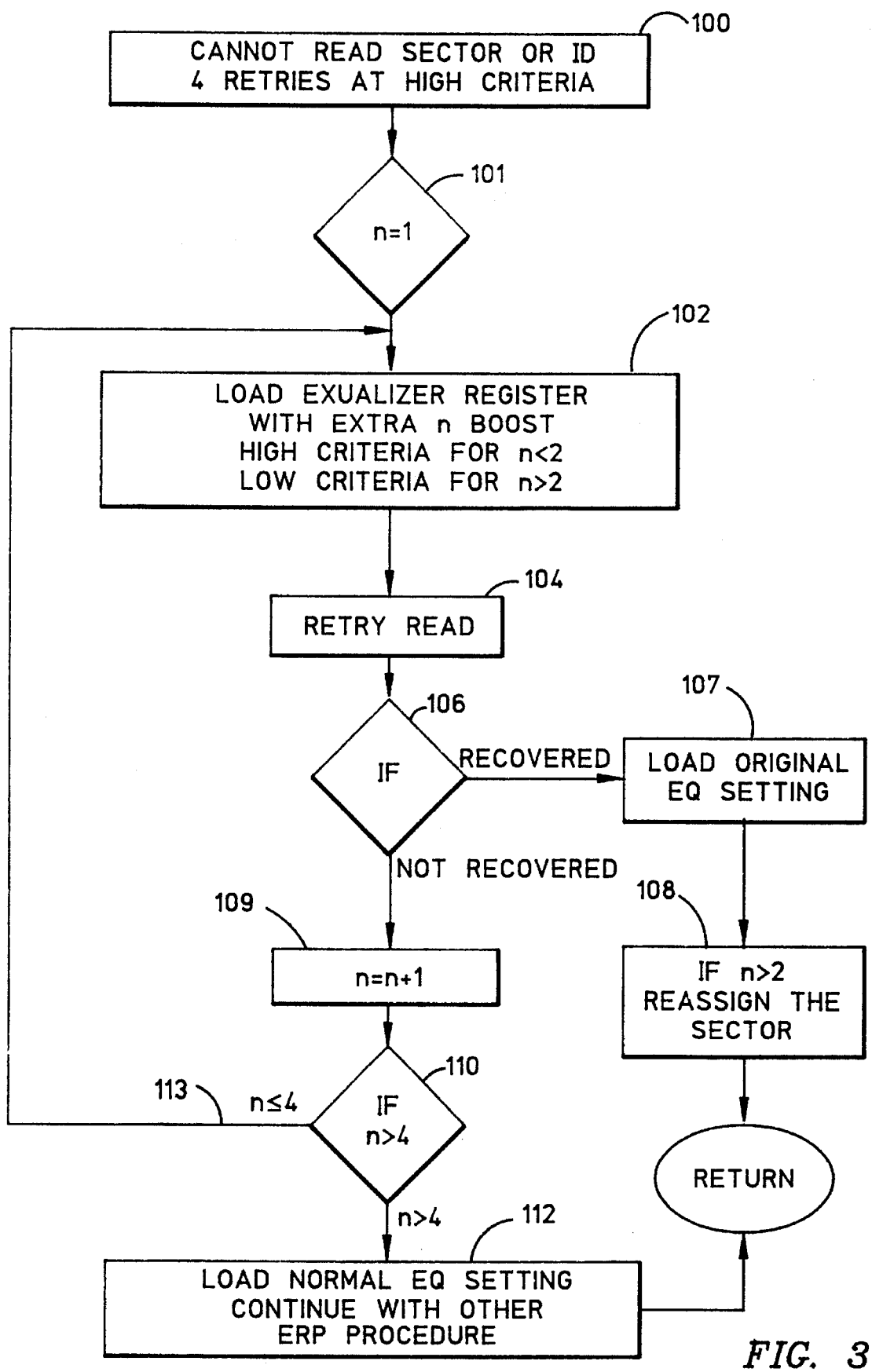
FIG. 3 is a flow diagram illustrating an error recovery procedure utilizing the adjustable equalizer of the invention.

With reference to FIG. 3, the operation of the invention in performance of an error recovery procedure will be explained. The error recovery procedure is controlled by error recovery logic 71 in the controller 30. This logic is also preferably microcode, but may be implemented wholly or partly in hardware. The error recovery logic 71 operates conventionally to detect and correct errors in data read from the disk 10. Additionally, the error recovery logic 73 includes the novel procedure illustrated in FIG. 3 and engages the microprocessor 39 in executing it. Initially, assume that a sector has been selected and the read element in the optical read/write head assembly 16 has been positioned to read the sector. Next, assume detection of an unacceptably high error rate in the data read from the sector. In this case, the controller 30 positions the read element at the sector and the microprocessor 39 begins the procedure illustrated in FIG. 3.

In block 100, the microprocessor 39 incrementally increases the gain of the equalizer 22 by increasing the magnitude of the boost adjustment signal 52. In step 101, the microprocessor 39 initializes an index (n) to 1 and then moves to block 102. In block 102, the microprocessor 39 loads a boost register of the adjustable equalizer 22 with a value that increases the gain level of the gain element 58. At the same time, the error recovery logic 71 sets a high criteria threshold level for calculation of an error rate in the data signal 27. In block 104, the error recovery logic 71 calculates an error rate in data read from the sector with the increased gain value and the high criteria threshold level. If the error rate in the data signal obtained during the read is acceptable, the sector is recovered and the test 106 is exited to 107 wherein the microprocessor 39 loads a normal gain setting into the gain registers of the adjustable equalizer 22. In block 108, the microprocessor 39 tests the value of the index n. If n is greater than 2, the data is reassigned to a spare sector, while the poorly-performing sector is marked as defective; otherwise, the data are read from the sector. Each time the read retry in block 104 fails the test in 106, the sector is marked as not recovered while the index n is incremented by 1 in block 109 and tested in block 110. If more than 4 passes have been made through the loop 102, 104, 106, 109, 110, the microprocessor 39 exits the decision 110 to block 112. The boost setting for normal operation of the adjustable equalizer 22 is loaded into the boost registers of the equalizer and other error recovery procedures are invoked for the sector. If n is less than or equal to 4, the microprocessor 39 follows the exit 113 from decision 110 back to block 102. In block 102, the high criteria threshold is retained until n is equal to or greater than 3. When n reaches a value of 3, the criteria threshold level is lowered.

While only certain preferred features of this invention have been shown by way of illustration, many changes and modifications will occur to those skilled in the art. Accordingly, it is to be understood that the appended claims are intended to cover all such modifications and changes as fall within the true spirit and scope of the invention.

We claim:

1. A recordable media drive, comprising:

a media drive signal source with a readback signal output;

a read channel with an input and a read channel signal output for providing a read channel signal, the read channel input connected to the readback signal output;

a signal error detector coupled to the read channel signal output;

a controller coupled to the signal error detector, the controller including an equalizer setting output, the controller providing equalizer configuration signals on the equalizer setting output in response to a data detected in the read channel signal;

an adjustable equalizer in the read channel with an input connected to the equalizer setting output, the adjustable equalizer having signal equalization characteristics set by the equalization configuration signals that compensate for the data error; and write/verify logic in the controller, the write/verify logic including means for generating a gain set signal and a bandwidth set signal at the equalizer setting output;

whereby, a gain of the adjustable equalizer is reduced in response to the gain set output and a bandwidth of the adjustable equalizer is increased in response to the bandwidth set output.

2. The recordable media drive of claim 1, wherein the adjustable equalizer has an adjustable gain that is selectively set by an equalizer setting signal on the equalizer setting output.

3. The recordable media drive of claim 1, wherein the adjustable equalizer has variable bandwidth that is selectively set by an equalizer setting signal on the equalizer setting output.

4. The recordable media drive of claim 1, wherein the signal error detector includes means for selectively varying an error occurrence threshold at which the data error is detected in the read channel signal and the adjustable equalizer has an adjustable gain that is selectively increased by an equalizer setting signal on the equalizer setting output when the error occurrence threshold is increased.

5. A recordable media drive, comprising:

a media drive signal source with a readback signal output;

a read channel with an input and a read channel signal output for providing a read channel signal, the read channel input connected to the readback signal output;

a process control means for conducting a write/verify procedure in the recordable media drive;

a controller coupled to the process control means, the controller including an equalizer setting output, the controller providing equalizer configuration signals on the equalizer setting output in response to the write/verify procedure;

an adjustable equalizer in the read channel with an input connected to the equalizer setting output, the adjustable equalizer having signal equalization characteristics set by the equalizer configuration signals that compensate for degradation of the read channel signal; and wherein the process control means includes write/verify logic in the controller, the write/verify logic including means for generating a gain set signal and a bandwidth set signal at the equalizer setting output;

whereby, a gain of the adjustable equalizer is reduced in response to the gain set output and a bandwidth of the adjustable equalizer is increased in response to the bandwidth set output.

6. The recordable media drive of claim 5, wherein the adjustable equalizer has a variable gain that is selectively set by an equalizer setting signal on the equalizer setting output.

7. The recordable media drive of claim 5, wherein the adjustable equalizer has variable bandwidth that is selectively set by an equalizer setting signal on the equalizer setting output.

8. The recordable media drive of claim 5, further including:

a signal error detector coupled to the read channel signal output;

the controller being coupled to the signal error detector, the controller providing equalizer configuration signals on the equalizer setting output in response to error occurrence detected in the read channel signal.

9. The recordable media drive of claim 1, wherein the adjustable gain is a high frequency gain.

10. The recordable media drive of claim 1, wherein the gain is a high frequency gain.

11. The recordable media drive of claim 6, wherein the variable gain is a high frequency gain.

12. The recordable media drive of claim 5, wherein the gain is a high frequency gain.

* * * * *